United States Patent [19]

Okada et al.

[11] 4,097,065
[45] Jun. 27, 1978

[54] SAFETY AIR CUSHION BAG IN AUTOMOTIVE VEHICLES

[75] Inventors: Motohiro Okada; Katsumi Oka, both of Asaka; Kiyoshi Honda, Wako; Kazuo Matsuura, Kamifukuoka, all of Japan

[73] Assignee: Honda Giken Kogyo Kabushiki Kaisha, Japan

[21] Appl. No.: 729,909

[22] Filed: Oct. 6, 1976

[30] Foreign Application Priority Data

Oct. 9, 1975 Japan .................................. 50-122279

[51] Int. Cl.$^2$ ............................................. B60R 21/08
[52] U.S. Cl. ...................................... 280/739; 280/743
[58] Field of Search .......................... 280/739, 728–738, 280/740, 742, 743; 244/138 R; 188/1 C

[56] References Cited

U.S. PATENT DOCUMENTS

| | | | |
|---|---|---|---|
| 3,573,885 | 4/1971 | Brawn et al. | 280/739 |
| 3,591,201 | 7/1971 | Brawn et al. | 280/730 |
| 3,784,225 | 1/1974 | Fleck et al. | 280/729 |
| 3,799,573 | 3/1974 | McDonald | 280/740 |
| 3,907,327 | 9/1975 | Pech | 280/729 |
| 3,937,488 | 2/1976 | Wilson | 280/736 |

*Primary Examiner*—Kenneth H. Betts
*Attorney, Agent, or Firm*—Polster, Polster and Lucchesi

[57] ABSTRACT

An improved safety air cushion bag which is constructed with a main body of the air cushion bag, an air outlet port formed in one part of the air cushion bag main body, and a gas-permeable cloth covering the air outlet port, the gas-permeable cover cloth being provided with at least one dart, or being so designed as to provide thereon with a bugle-out portion to prevent the cover cloth from becoming torn out, or separated from the air cushion bag main body at the joined portion between them due to excessive load to be imparted thereto at the time of collision accident of the automotive vehicles, thereby protecting vehicle riders or passengers from unexpected danger of the traffic accident.

1 Claim, 7 Drawing Figures

SAFETY AIR CUSHION BAG IN AUTOMOTIVE VEHICLES

BACKGROUND OF THE INVENTION a. Field of the Invention

This invention relates to a self-inflating air cushion bag. More particularly, it is concerned with a safety air cushion bag or pillow for use in an automobile and like other vehicles, which is inflated by a pressurized gas at the time of collision of the vehicle in traffic accident so as to protect riders or passengers in the vehicle from unexpected danger of the traffic accident.

b. Description of Prior Arts

Owing to remarkable improvement in the running performance of automobiles in conjunction with improved road conditions, the automobiles can be driven as high a speed as ever made possible. With increase in the running speed in such vehicles, however, collision accidents happen not infrequently between automobiles running along road, causing serious injury or tragic death of the vehicle riders or passengers.

In order to avoid such unexpected misery on the part of the vehicle riders, use of a safety seat belt has been prompted, which has now become the "must" equipment in most automobiles. However, even the safety seat belt is not still safe enough to protect the vehicle riders from unexpected injury or death due to extremely heavy shock at the collision, particularly, in the case of the automotive vehicles running at a speed as high as 35 miles/hour and above, at which an incredibly heavy shock is potentially applied to the vehicle riders.

Therefore, in addition to the safety seat belt, an air-cushion bag or pillow which is inflated instantaneously at the time of a collision accident being taken place, and which absorbs the great shock imposed on the human body, has been contemplated for use along with the safety seat belt. For this kind of self-inflating air cushion bag or pillow, there has already been known such one that is provided in one part thereof with a circular air outlet port which serves as an escape from a load imparted to the air cushion bag, after it is inflated, by the weight of the vehicle rider who is leaning frontward due to the moment of inertia at the collision so that he or she may be prevented from bouncing by the restitutive force of the inflated air cushion bag.

In the air cushion bag of the above-described construction, the circular air outlet port is covered with a gas-permeable cloth, the peripheral edge of which is joined to the main body of the air cushion bag by any appropriate expedient such as, for example, stitching, to thereby control the outflowing quantity of air from the inflated air cushion bag in accordance with the load imparted thereto. With this inflated air cushion bag, however, there exists a serious disadvantage such that, since an excessive load is instantaneously imparted to the inflated air cushion bag at the time of collision of the automotive vehicles, it is subjected to deformation with the consequence that the circular air outlet port per se is also deformed from circle to ellipse, and, at the same time, following this deformation of the air outlet port, the gas-permeable cloth is stretched by a large resistance caused by the outflowing air to unavoidably stretch the cloth in the direction of the long (or major) diameter of the above-mentioned elliptically deformed air outlet port, as the result of which the cover cloth is torn out, or the peripheral edge portion thereof joined to the main body of the air cushion bag is broken to make it difficult to secure a stable air outlet performance. The tearing of the cloth becomes enhanced when knitted fabric having a certain specific directivity in its elongation is used as the gas-permeable cloth material, and the tensile force is applied to the direction where the cloth is rather difficult to stretch.

SUMMARY OF THE INVENTION

In view of the afore-described disadvantage which is inherent in the known type of the self-inflating safety air cushion bag, it is a primary object of the present invention to provide an improved safety air cushion bag which is free from tear of the gas-permeable cloth covering the air outlet port formed in the main body of the air cushion, or separation of the joined peripheral edge of the cover cloth from the main body of the air cushion bag.

It is another object of the present invention to provide an improved safety air cushion bag for use in automotive vehicles which is capable of absorbing the excessive load applied thereto by the frontwardly leaning vehicle rider at the time of the collision accident by means of a suitable gas-permeable cloth provided at one portion thereof with a dart, or darts.

According to the present invention, generally speaking, there is provided a safety air cushion bag for use in automotive vehicles, etc., which comprises in combination: (a) a main body of the air cushion bag; (b) an air outlet port formed in one part of the air cushion bag; and (c) a gas-permeable cloth to close the air outlet port, the gas-permeable cloth having thereon a slackening portion to prevent the cover cloth from becoming torn for itself, or separated from the main body of the safety cushion at the joined portion therebetween due to excessive load imparted to the air cushion bag.

The foregoing objects, other objects as well as detailed construction and function of the safety air cushion according to the present invention will become more apparent and understandable from the following detailed description thereof, when read in conjunction with the accompanying drawing.

BRIEF DESCRIPTION OF THE ACCOMPANYING DRAWING

DETAILED DESCRIPTION OF PREFERRED EMBODIMENTS

Figure 1:
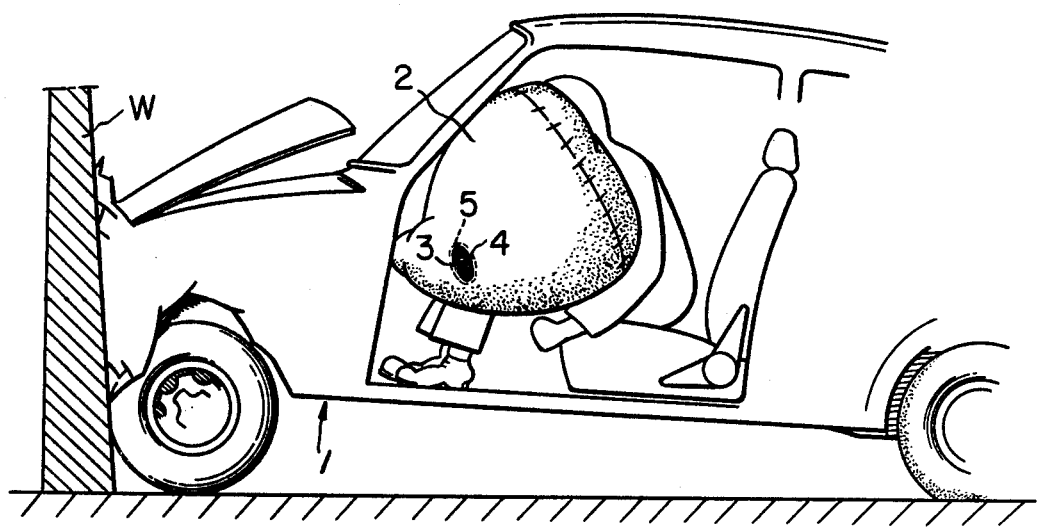
FIG. 1 is a general view showing the safety air cushion bag as inflated, when an automobile collides against a rigid concrete wall.

As shown in FIG. 1, when an automobile 1 collides against an object such as, for example, a rigid concrete wall W, the vehicle rider is thrown out of his seat due to the moment of inertia, at which time the safety air cushion bag becomes instantaneously inflated to receive the vehicle rider who is violently leaning frontward to hit himself against the front panel or front window glass, and to absorb the excessive load imparted to the cushion bag due to the inertia, thereby protecting him from serious injury.

At this time, if there is provided no air outlet port, or the air outlet port is provided with a cover cloth which has no stretchability to the resistance caused to the cover cloth due to the outflowing air from the air cushion bag, when the excessive load is imparted thereto, the vehicle rider is bounced by the restitutive force of the air cushion bag as inflated, or in an extreme case, the cover cloth for the air outlet port is torn or separated from the cushion main body along the joined portion between them by an overriding resistance force, and does not properly function as the cushion or shock absorber.

In order therefore that the air-permeable cover cloth for the air cushion may serve as the escape means for the outflowing air, the cover cloth per se should have a certain allowance or tolerance to accommodate the outflowing air therein for an instance.

Figure 2:
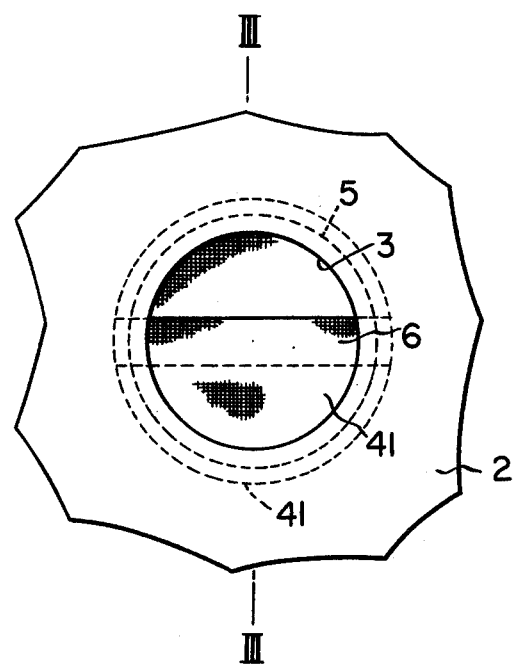
FIG. 2 is a front view of one embodiment of a safety air cushion bag 2 according to the present invention.
Figure 3:
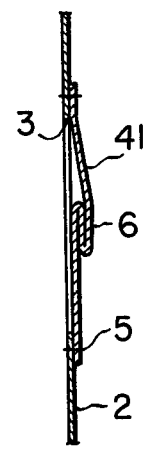
FIG. 3 is a cross-sectional view of the air outlet port formed in the safety air cushion bag, when viewed along the line III—III in FIG. 2.

For the abovementioned purpose, the example of the safety air cushion bag as illustrated in FIGS. 2 and 3 is designed in such a manner that a dart 6 is provided in the diametrical direction of a gas-permeable cloth 41 which covers the air outlet port in the safety air cushion bag.

Figure 4:
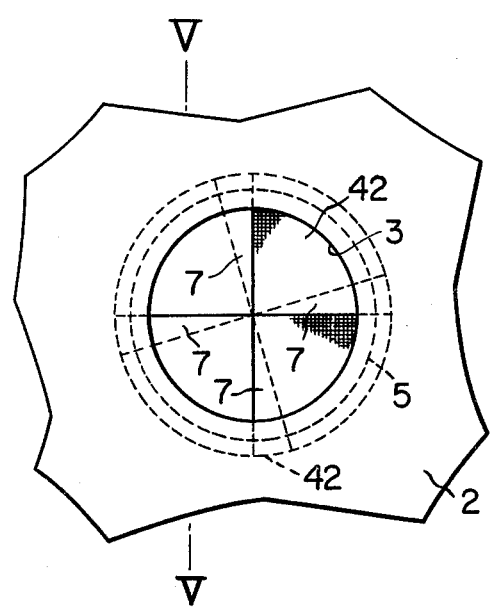
FIG. 4 is a front view showing a modified embodiment of the air outlet port formed in the safety air cushion bag.
Figure 5:
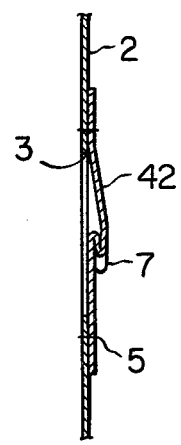
FIG. 5 is a cross-sectional view of the air outlet port shown in FIG. 4, when viewed along the line V—V therein.

Another example of the safety air cushion bag according to the present invention as illustrated in FIGS. 4 and 5 is designed in such a manner that a plurality of darts 7 are formed radially at four places on the gas-permeable cloth 42 covering the air outlet port in the safety air cushion bag, the darts radially extending from the center of the air outlet port.

Figure 6:
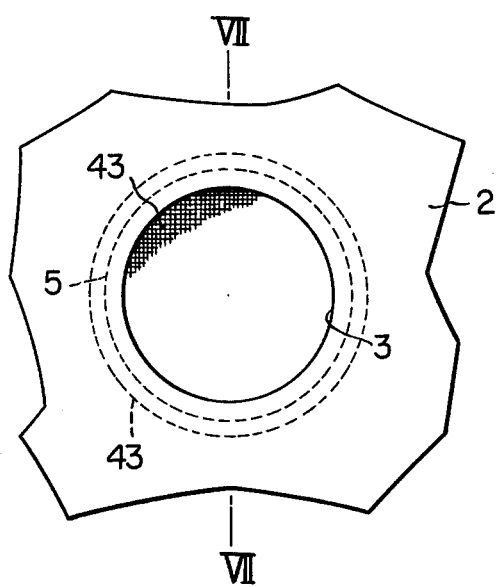
FIG. 6 is a front view of another modified embodiment of the air outlet port in the safety air cushion bag.
Figure 7:
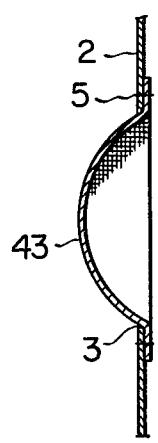
FIG. 7 is a cross-sectional view of the air outlet port shown in FIG. 6, when viewed along the line VII—VII therein.

In still another example of the safety air cushion bag according to the present invention as illustrated in FIGS. 6 and 7, the gas-permeable cloth 43 covering the air outlet port formed in the safety air cushion bag is designed to have a bulge-out portion when it is subjected to an excessive load at the time of the vehicle collision. A reference numeral 5 around the air outlet port designates a stitching or joining line of the gas-permeable cover cloth to the main body of the safety air cushion bag.

Besides the afore-described various preferred embodiments of providing the cover cloth for the air outlet port in the safety air cushion bag with a certain allowance or slack to the excessive load in accordance with the present invention, there can be contemplated many other ways of modification such as, for example, that the gaspermeable cover cloth is formed in a bellow-shape, and so forth.

In the example shown in FIGS. 2 and 3, when a cloth is used that has a directivity with respect to its elongation such as, for example, knit fabric, etc., which can easily be stretched in one direction and is relatively difficult to stretch in a direction at right angles to the first direction, as the gas-permeable cover cloth 41 for the air outlet port, it is preferable that the dart 6 be provided on the gaspermeable cover cloth such that the folds of the dart extend in the direction thereof, in which the fabric has good stretchability.

As stated in the foregoing, since the gas-permeable cover cloth for the air outlet port formed in the safety air cushion bag according to the present invention is provided with a single or a plurality of darts, or is designed to bulge outward of the cushion main body in the form of a round cup, the gas-permeable cover cloths 41, 42, and 43 as shown in FIGS. 2 to 7, respectively, are able to readily conform to the deformation in the air outlet port owing to the dart, or the bulgeout portion, or other slackening portion provided on the gas-permeable cover cloth, even when the air outlet port 3 deforms due to excessive load applied at the time of the vehicle collision, to avoid compelling tensile force to act on the cover cloth, so that no joined portion between the cover cloth and the main body of the safety air cushion is separated, nor the gas-permeable cover cloth 41 per se is torn out. Hence, favorable air outlet performance can be attained, and the vehicle rider is safely protected from unexpected danger of the colliding accident.

Although the present invention has been described with reference to a few preferred embodiments thereof, it should be understood that these embodiments are merely illustrative and not so restrictive to the scope of the present invention, and that any change and modification may be made by those persons skilled in this field of art without departing from the spirit and scope of the present invention as set forth in the appended claims.

What is claimed is:

1. A safety air cushion bag for use in automotive vehicles and the like, which comprises in combination:
    (a) a main body of said air cushion bag;
    (b) a circular air outlet port formd in one part of said air cushion bag;
    (c) a gas-permeable cloth joined to said bag around the periphery of said circular air outlet port, said gas-permeable cloth being stretchable in one direction and being relatively difficult to stretch in a direction at right angles to the stretch direction; and
    (d) a dart formed on said gas-permeable cloth which extends through the center of said circular air outlet port, folding lines of said dart being substantially at right angles to the direction in which said cloth is relatively difficult to stretch,
    so that said gas-permeable cloth is able to readily conform to the deformation in said air outlet port owing to the stretch of said gas-permeable cloth itself and to said dart.

* * * * *